Patented June 3, 1924.

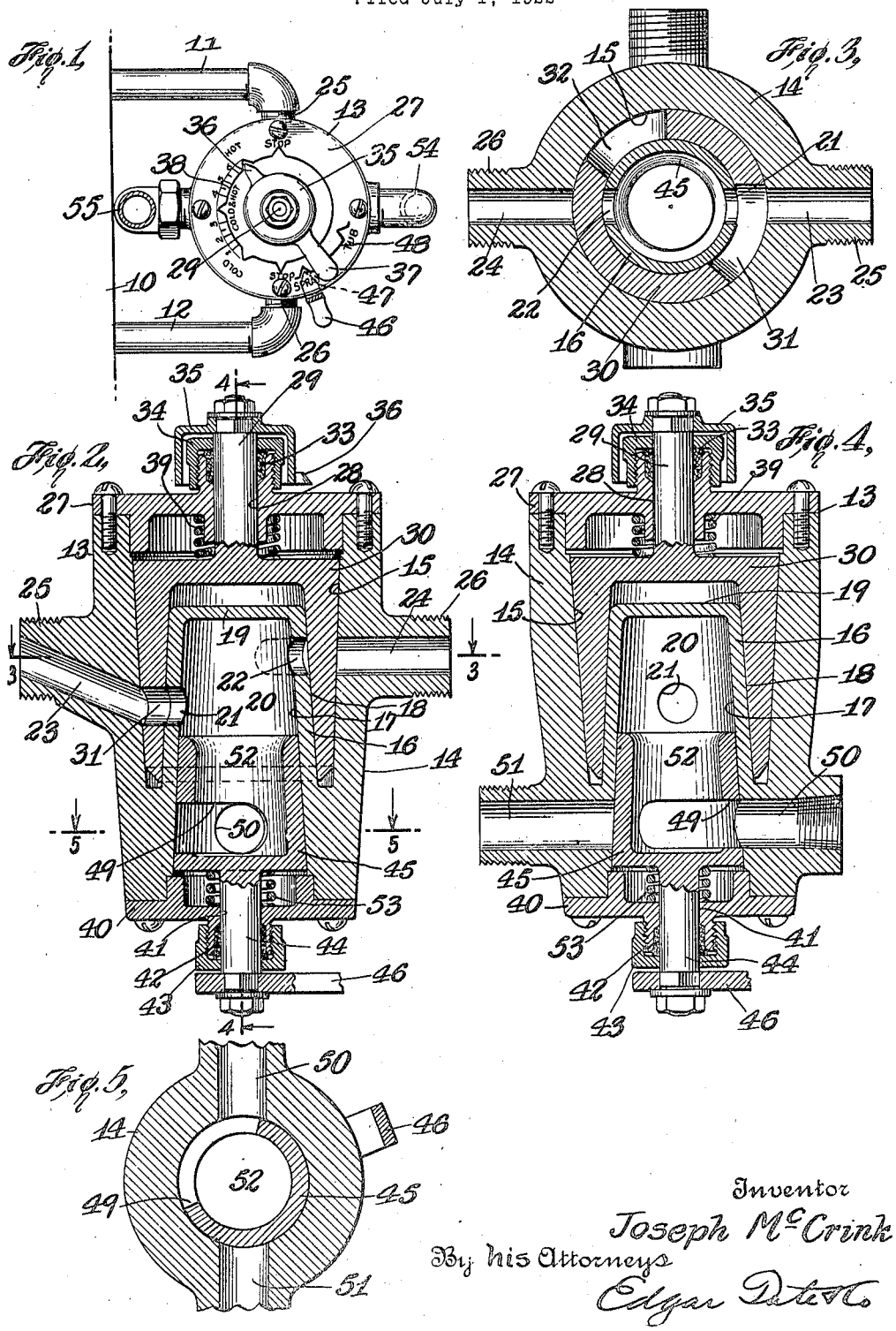

1,496,584

UNITED STATES PATENT OFFICE.

JOSEPH McCRINK, OF NEWARK, NEW JERSEY.

VALVE.

Application filed July 1, 1922. Serial No. 572,187.

*To all whom it may concern:*

Be it known that I, JOSEPH McCRINK, a citizen of the United States, and residing at Newark, in the county of Essex and State of New Jersey, have invented certain new and useful Improvements in Valves, of which the following is a specification, such as will enable those skilled in the art to which it appertains to make and use the same.

This invention relates to valves and particularly to what are known as two-way valves adapted to control the discharge of hot and cold water, and the object of the invention is to provide a valve device of the class specified employing a main conical valve element adapted to control ports or passages in the valve body whereby a proportionate amount of hot and cold water discharged into the valve device may be regulated; a further object being to provide a supplemental valve element for controlling the discharge of water from said valve body; and with these and other objects in view the invention consists in a valve device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of my improved valve device indicating one method of its use;

Fig. 2 is a transverse section through the valve device and on an enlarged scale;

Fig. 3 is a partial section on the line 3—3 of Fig. 2;

Fig. 4 is a sectional view through the valve device at right angles to that shown in Fig. 2 of the drawing and on the line 4—4 of Fig. 2; and, Fig. 5 is a partial section on the line 5—5 of Fig. 2.

My improved valve device is designed particularly for use in connection with bath tubs, and in Fig. 1 of the drawing, I have indicated at 10 one wall of a bath tub in connection with which hot and cold water pipes 11 and 12 are mounted and coupled with my improved valve device 13. My improved valve device 13, in the construction shown, comprises a valve casing 14 which is approximately cylindrical in form in cross section and in the top of said body is a bore opening outwardly therethrough and provided with a tapered seat 15. A conical member 16 extends into the tapered portion of said bore, the inner and outer walls 17 and 18 of which are adapted to form seats for suitable valve elements, as hereinafter set out. The top of the member 16 is closed as shown at 19 to form a mixing chamber 20 within said member, and said mixing chamber extends downwardly through the valve body 14 and opens outwardly through the lower end thereof, as clearly shown in Figs. 2 and 4 of the drawing. The member 16 is provided with oppositely arranged ports 21 and 22 which are spaced one above the other, as clearly shown in Fig. 2 of the drawing, and which are adapted to register with bores 23 and 24, which extend through the threaded bosses 25 and 26 on the valve body 14. The hot and cold water pipes 11 and 12 are adapted to be connected with the bosses 25 and 26, as shown in Fig. 1 of the drawing.

The top of the valve body 14 is provided with a cover member 27 which closes the bore opening outwardly through the top of said valve body, and said cover member is provided with a central aperture 28 through which the stem 29 of a main valve element 30 is adapted to pass, said valve element being tubular in form and the inner and outer walls of which are tapered to correspond with the tapered seat 15, and the outer face 18 of the member 16. Said valve unit is provided with ports 31 and 32 adapted to register with the ports 21 and 22 and bores 23 and 24, and these ports are also arranged in alinement with said last named ports and bores.

The aperture 28 is provided around the valve stem 29 with a suitable stuffing box 33 held in position by a sleeve nut 34, and an indicator and valve operating member 35 is secured on the protruding end of the valve stem 29 and is provided with a pointer 36 and handle member 37. The pointer 36 is adapted to cooperate with a suitable dial or indicator 38 upon the top of the cover member 27. A spring 39 is also preferably mounted between the cover member 27 and the top of the valve element 30 to normally hold said valve element in a seated position.

The bottom of the valve body 14 is provided with a cover plate 40 having a central aperture 41 and stuffing box 42 held in position by a sleeve nut 43, and the stem 44 of a supplemental valve unit 45 is mounted in the aperture 41 and extends therethrough and a suitable indicator and valve operating device 46 is secured to the protruding end of the stem 44, and said device 46 is provided with a pointer 47 adapted to register with a suitable dial 48 upon the top face of the cover member 27. The valve element 45 is tubular and conical in form and is adapted to seat on the inner face 17 of the member 16, as clearly shown in Figs. 2 and 4, and said valve element is provided with an elongated port 49 which is adapted to register with either one of two discharge ports or passages 50 and 51 in the bottom portion of the casing or valve body 14. The chamber 52 within the valve element 45 opens into the mixing chamber 20 of the member 15, as clearly shown in said figures. A spring 53 is also preferably placed between the valve element 45 and the cover plate 40 to normally hold said valve element in a seated position.

In practice, a water discharge nozzle 54 is connected with the casing or valve body 14 and in communication with the port or passage 15, and a water discharge pipe 55 is also connected with the casing and communicates with the port or passage 51. The pipe 55 is adapted to be connected with a suitable shower or spray device while the discharge device 54 is adapted to discharge water into the tub or other basin in connection with which my improved valve device is employed.

The use of my improved valve device will be readily understood from the foregoing description when taken in connection with the accompanying drawing and the following statement. It will be understood that the main valve unit 30 controls the admission of hot and cold water into the mixing chamber 20 of the valve device and the proportionate amount of hot and cold water is regulated by the position of said valve element in the valve body and may be governed by rotating said valve element by the handle member 37, and the dial 38 may be used to guide the operator in this operation. In other words the hot water intake to the mixing chamber 20 may be greater or less than the cold water intake to said mixing chamber, or either one of said water supplies may be entirely cut-off and hot or cold water alone may be passed into said mixing chamber. The supplemental valve element 45 controls the discharge of the water from the valve device, and said valve element will govern the discharge either through the nozzle 54, or the pipe 55 to a shower or spray device, and also to shut off the discharge of water through either of said discharging means.

With my improved valve device hot water or cold water may be discharged through the nozzle 54, or through the pipe 55, or lukewarm water or, in other words, a combination of hot and cold water may be discharged through either of such means, and the supplemental valve element will control the discharge and the volume of water passed through the discharging means, and the means for operating the supplemental valve element being provided with means for designating the position of said valve element. It will be understood that while I have shown a specific application of my improved valve device and have shown certain details of construction for carrying my invention into effect, I am not necessarily limited to these details, and various changes therein and modifications thereof may be made, within the scope of the appended claims, without departing from the spirit of my invention, or sacrificing its advantages.

Having fully described my invention, what I claim as new and desire to secure by Letters Patent, is:—

1. A valve device of the class described comprising a suitable valve body, a mixing chamber in said valve body, means for admitting independent supplies of liquid to said mixing chamber, and a valve element mounted in said valve body independent of and encircling said mixing chamber and adapted to control the communication between said last named means and said mixing chamber.

2. A valve device of the class described comprising a suitable valve body, a cylindrical member in said valve body, and forming a mixing chamber therein, means for admitting independent supplies of liquid to said mixing chamber, a valve element mounted in said valve body and cooperating with said member and adapted to control the communication between said last named means and said mixing chamber, and a supplemental valve element for controlling the discharge from said mixing chamber.

3. A valve device of the class described comprising a suitable valve body, a cylindrical member in said valve body and forming a mixing chamber therein, means for admitting independent supplies of liquid to said mixing chamber, a valve element mounted in said valve body and cooperating with said member and adapted to control the communication between said last named means and said mixing chamber, said valve body being provided with independent discharges adapted to be placed in communication with said mixing chamber, and means for controlling said discharges.

4. A valve device of the class described comprising a valve body provided with a mixing chamber, independent ports adapted to be placed in communication with said chamber, and a valve element movably mounted in said valve body and surrounding said mixing chamber and adapted to control the communications between said ports and said mixing chamber.

5. A valve device of the class described comprising a valve body provided with a mixing chamber, independent ports adapted to be placed in communication with said chamber, a valve element movably mounted in said valve body and surrounding said mixing chamber and adapted to control the communications between said ports and said mixing chamber, and means for indicating the position of said valve element.

6. A valve device of the class described comprising a valve body provided with a mixing chamber, independent ports adapted to be placed in communication with said chamber, a valve element movably mounted in said valve body and surrounding said mixing chamber and adapted to control the communications between said ports and said mixing chamber, and means for operating said valve element.

7. A valve device of the class described comprising a valve body provided with a mixing chamber, independent ports adapted to be placed in communication with said chamber, a valve element movably mounted in said valve body and surrounding said mixing chamber and adapted to control the communications between said ports and said mixing chamber, said valve body being provided with independent discharge passages in communication with said mixing chamber, and means for controlling said discharge passages.

8. A valve device of the class described comprising a valve body provided with a mixing chamber, independent ports adapted to be placed in communication with said chamber, a valve element movably mounted in said valve body and surrounding said mixing chamber and adapted to control the communications between said ports and said mixing chamber, said valve body being provided with independent discharge passages in communication with said mixing chamber, means for controlling said discharge passages, and means for operating said last named means.

9. A valve device of the class described comprising a valve body provided with a mixing chamber, independent ports adapted to be placed in communication with said chamber, a valve element movably mounted in said valve body and surrounding said mixing chamber and adapted to control the communications between said ports and said mixing chamber, said valve body being provided with independent discharge passages in communication with said mixing chamber, means for controlling said discharge passages, means for operating said last named means, and means for indicating the position of said last named means.

10. A valve device of the class described comprising a valve body provided with a conical tubular member forming a mixing chamber centrally of said body, said member being provided with ports adapted to register with passages in said valve body, and a conical tubular valve element mounted in said valve body and encircling the mixing chamber and provided with ports adapted to control the communications between said first named ports and said passages.

11. A valve device of the class described comprising a valve body provided with a conical tubular member forming a mixing chamber centrally of said body, said member being provided with ports adapted to register with passages in said valve body, and a conical tubular valve element mounted in said valve body and provided with ports adapted to control the communications between said first named ports and said passages, the inner and outer faces of said valve element being tapered to seat in said valve body and on said member.

12. A valve device of the class described comprising a valve body provided with a conical tubular member forming a mixing chamber centrally of said body, said member being provided with ports adapted to register with passages in said valve body, a conical tubular valve element mounted in said valve body and provided with ports adapted to control the communications between said first named ports and said passages, the inner and outer faces of said valve element being tapered to seat in said valve body and on said member, and tensional means for holding said valve element in a seated position.

13. A valve device of the class described comprising a valve body provided with a conical tubular member forming a mixing chamber centrally of said body, said member being provided with ports adapted to register with passages in said valve body, a conical tubular valve element mounted in said valve body and provided with ports adapted to control the communications between said first named ports and said passages, the inner and outer faces of said valve element being tapered to seat in said valve body and on said member, said valve body being provided with discharge passages, and a tubular conical valve element for controlling said passages and for placing the same in communication with the mixing chamber of said member.

14. A valve device of the class described comprising a valve body provided with a conical tubular member forming a mixing chamber centrally of said body, said member being provided with ports adapted to register with passages in said valve body, a conical tubular valve element mounted in said valve body and provided with ports adapted to control the communications between said first named ports and said passages, the inner and outer faces of said valve element being tapered to seat in said valve body and on said member, said valve body being provided with discharge passages, a tubular conical valve element for controlling said passages and for placing the same in communication with the mixing chamber of said member, and tensional means for normally holding said last named valve element in a seated position.

In testimony that I claim the foregoing as my invention I have signed my name this 21st day of June, 1922.

JOSEPH McCRINK.